Sept. 25, 1956    A. PRATT    2,764,740
FOLDED WAVE GUIDE T
Filed March 17, 1951
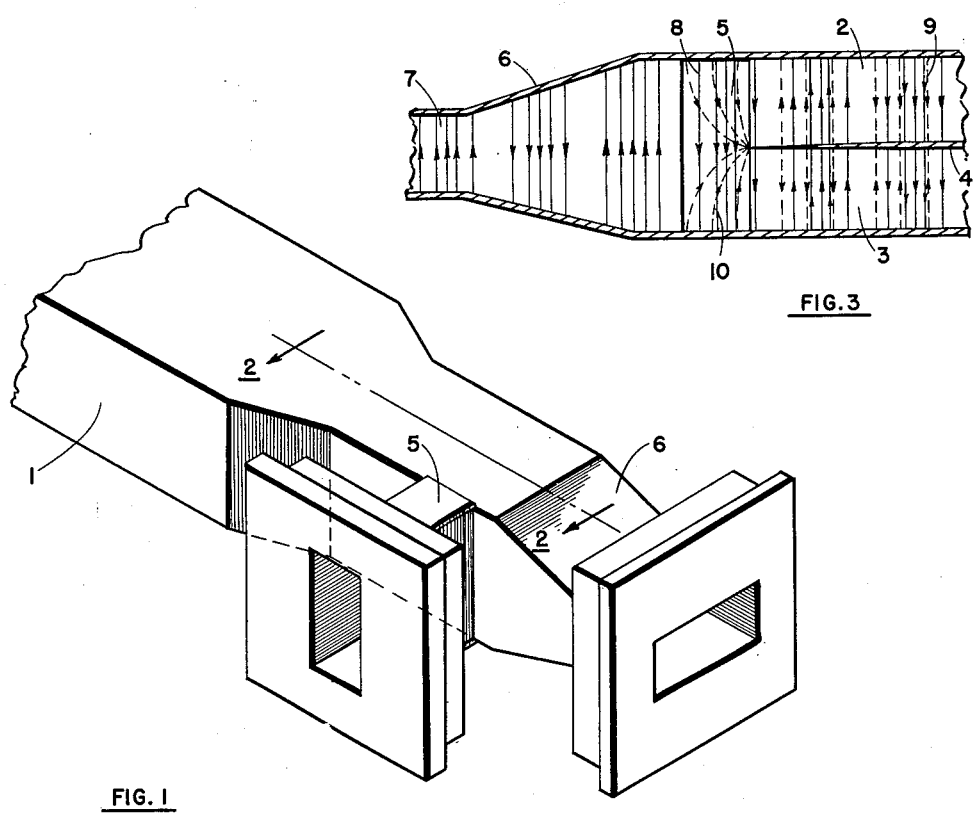
FIG. 1
FIG. 3
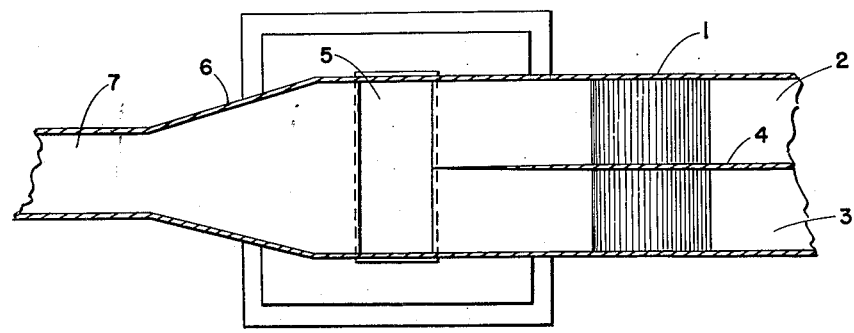
FIG. 2
INVENTOR.
AMASA PRATT
BY
*William P. Lane*
ATTORNEY

United States Patent Office 2,764,740
Patented Sept. 25, 1956

2,764,740
FOLDED WAVE GUIDE T

Amasa Pratt, Sherman Oaks, Calif., assignor to North American Aviation, Inc.

Application March 17, 1951, Serial No. 216,143

3 Claims. (Cl. 333—11)

This invention relates to transmission of high frequency radar pulses through rectangular wave guides, and particularly to a novel wave guide T adapted to couple out of a wave guide junction mutually out-of-phase components of transverse electric waves in two colinear guides connected to the junction.

It is an object of this invention to provide a wave guide junction adapted to separate the complex transverse electric waves propagated in two colinear rectangular guides into mutually in-phase and mutually out-of-phase components.

It is another object of this invention to provide a wave guide T having two colinear rectangular wave guide inputs, one output guide for propagating transverse electric waves mutually in-phase in said two colinear guides, and one branching output guide for propagating mutually out-of-phase transverse electric waves in said two colinear guides.

Other objects of invention will become apparent from the following description taken in connection with the accompanying drawings, in which:

Fig. 1 is a perspective view of the invention;

Fig. 2 is a sectional view of the invention taken at 2—2 in Fig. 1;

And Fig. 3 is a plot of the electric field lines in Fig. 2.

Referring now to Figs. 1 and 2, a colinear wave guide 1 comprising upper guide 2 and lower guide 3 separated by septum 4 is shown connected to branching guide 5 which is also a rectangular wave guide. Guides 2 and 3 are joined to tapered section 6 which in turn is connected to rectangular guide 7. This invention is for use in connection with radar transmission and reception in the X-band, preferably at a frequency of about 9375 mc. It is particularly useful in connection with a duomode monopulse system as disclosed in patent application Serial No. 216,145, filed March 17, 1951, in the name of Robert M. Ashby for Duomode Monopulse Radar System. The requirement met by this invention is the simultaneous separation of mutually out-of-phase components of transverse electric waves in two colinear guides from mutually in-phase components therein, and the combination of said mutually in-phase components with each other.

Let it be assumed that transverse electric waves are being propagated through colinear wave guides 2 and 3, from right to left in Figs. 2 and 3. If these waves are exactly in-phase, the direction of the fields may be indicated by the solid arrows in Fig. 3, where the density of the arrows indicates the intensity of the electric fields, and the arrow heads indicate their direction. Where septum 4 ends in Figs. 2 and 3 the mutually in-phase transverse electric waves in the two colinear guides merely combine as at 8 in Fig. 3 and will not propagate out branching guide 5 because the transverse dimension thereof is too small to support propagation at this wave length. Assuming now, however, that a complex transverse electric wave which may be resolved into mutually in-phase and mutually out-of-phase components exists in the two colinear guides, the out-of-phase components thereof may be represented by dotted lines as shown at 9 in Fig. 3; and it will be noted that the arrows point in opposite directions in the two guides, indicating that at each point these field lines represent the mutually out-of-phase component of the transverse electric waves. At the end of septum 4 the mutually out-of-phase waves tend to interact and the field lines tend to shorten each other; and the wave will not propagate to the left in Fig. 3. The curved field indicated at 10 is formed, however, and these lines may couple to branching guide 5 which extends normal to the axis of the colinear guides, because in this case the curved field has a component in the horizontal direction in Figs. 2 and 3. The mutually out-of-phase component of the transverse electric waves in the two colinear guides is therefore coupled to branching guide 5 and is taken out of the main wave guide. The mutually in-phase components, however, combine and are transmitted through tapered section 6 and wave guide 7. Tapered section 6 is required to improve the impedance match between rectangular guide 7 and colinear guides 2 and 3. Well-known devices such as irises may of course be used to further improve impedance matches between the colinear guides and the output guides. It will be noted that whether the complex wave propagated in colinear guide 2 leads or lags the transverse electric wave propagated in colinear guide 3 is indicated by the phase relation between the transverse electric waves propagated through branching guide 5 and through rectangular guide 7. In Fig. 3, if the field lines are directed as indicated at 10, it can be seen that the portion of guide 5 immediately adjacent to the connection will accommodate field lines directed from left to right in Fig. 3. This condition indicates that upper guide 2 leads lower guide 3. When lower guide 3 leads upper guide 2 the arrows at 10 point in the opposite direction, causing the field lines in branching guide 5 to be directed from right to left. Thus the sign of very fine phase differences between the transverse electric waves in guides 2 and 3 may be determined merely by comparing the phase of the transverse electric waves in branching guide 5 with the phase of transverse electric waves in rectangular guide 7 at some remote point by means of some phase-sensitive circuit such as that disclosed in Fig. 6 of the patent application referred to above.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A wave guide junction comprising two parallel contiguous rectangular input wave guides having one of their wide sides in common, a first single rectangular wave guide having its wide cross-sectional dimension approximately equal to the combined narrow dimensions of said input guides connected to the narrower sides of the ends of said input guides, said common side terminating at the point of connection of said first single rectangular wave guide, and a second single rectangular guide forming a continuation to the outside walls of the combination of said input guides, all said guides opening into each other and electrically connected to each other and forming a common junction, whereby mutually out-of-phase transverse electric waves in said input guides are coupled out of said junction through said first single guide, and mutually in-phase transverse electric waves in said input guides combine and are propagated through said second single guide.

2. A wave guide junction comprising two parallel rectangular input guides having a common side, a first rectangular output guide branchingly connected to adjacent non-common coplanar sides of the ends of said input guides at the same said ends and electrically communicating with and opening into said input guides oriented to propagate only transverse electric waves mutually out-of-phase in said input guides, and a second rectangular output guide abutting said input guides electrically connected thereto and opening thereinto to propagate only transverse electric waves mutually in-phase in said input guides to thereby provide for separation of mutually in-phase transverse electric waves from mutually out-of-phase transverse electric waves propagated together in said input guides.

3. A microwave wave guide junction comprising a first hollow conductive rectangular conduit, the cross-section of said conduit having a width $a$ and a height $b$; second and third contiguous hollow conductive rectangular conduits each having a cross-sectional width $a$ and a combined cross-sectional height $b$, said second and third conduits being coaxially and abuttingly connected with said first conduit so that the outside non-contiguous walls of said second and third conduits form a continuation of the walls of said first conduit; a fourth hollow conductive rectangular conduit having a cross-sectional height $b$ and a cross-sectional width $a$ to said first conduit connected on a side thereof having a height $b$ and branching therefrom at the point of connection between said first conduit and said second and third conduits, the interior of all said guides communicating with each other and being electrically connected with each other at the common junction thereof.

References Cited in the file of this patent
UNITED STATES PATENTS

| | | |
|---|---|---|
| 2,514,678 | Southworth | July 11, 1950 |
| 2,540,839 | Southworth | Feb. 6, 1951 |
| 2,575,804 | Friis | Nov. 20, 1951 |
| 2,587,590 | Brewer | Mar. 4, 1952 |
| 2,643,295 | Lippmann | June 23, 1953 |

OTHER REFERENCES

Surdin: "Directive Couplers in Wave Guides," Journal of I. E. E., vol. 93, Pt. IIIA, No. 4; published 1946. Page 735 relied on.

Publication I: "The Duo-Mode Exiter" by Hughes and Astrahan; published in the Proceedings of the I. R. E., vol. 37, No. 9, September 1949, page 1031. (Copy in 178-44-1D.)

Publication II: "Microwave Duplexers," edited by Smullin and Montgomery, vol. 14, of Radiation Laboratory Series; published in McGraw-Hill in 1948, only page 355 relied on. (Copy in Library.)

Publication IV: Ragan, Microwave Transmission Circuits, vol. 9, M. I. T. Rad. Lab. series; published 1948 McGraw-Hill, pages 522-25 relied on. (Copy in Patent Office Library.)